United States Patent [19]
Kimishima

[11] Patent Number: 5,978,846
[45] Date of Patent: Nov. 2, 1999

[54] INTER-COMPUTER COMMUNICATION SYSTEM

[75] Inventor: Hiroaki Kimishima, Kawasaki, Japan

[73] Assignee: Fujitsu Limited, Kawasaki, Japan

[21] Appl. No.: 08/725,953

[22] Filed: Oct. 7, 1996

[30] Foreign Application Priority Data

Oct. 11, 1995 [JP] Japan .................................. 7-263312

[51] Int. Cl.$^6$ .................................................. G06F 13/14
[52] U.S. Cl. ........................ 709/227; 709/228; 709/238; 709/239
[58] Field of Search ........................ 395/200.12, 200.16, 395/280, 200.57, 200.58, 200.68, 200.69; 709/227, 228, 238, 239

[56] References Cited

U.S. PATENT DOCUMENTS

| | | | |
|---|---|---|---|
| 4,363,093 | 12/1982 | Davis et al. | 395/200.57 |
| 5,121,382 | 6/1992 | Yang et al. | 370/31 |
| 5,179,669 | 1/1993 | Peters | 395/325 |
| 5,495,582 | 2/1996 | Chen et al. | 395/200.12 |
| 5,502,724 | 3/1996 | Chen et al. | 370/85.3 |
| 5,548,578 | 8/1996 | Matsune et al. | 370/13 |
| 5,553,241 | 9/1996 | Shirakihara | 395/200.12 |
| 5,553,242 | 9/1996 | Russel et al. | 395/200.12 |
| 5,555,298 | 9/1996 | Jonsson | 379/207 |
| 5,572,678 | 11/1996 | Homma et al. | 395/200.12 |

FOREIGN PATENT DOCUMENTS 4-116745 4/1992 Japan .

*Primary Examiner*—Zarni Maung
*Assistant Examiner*—Saleh Najjar
*Attorney, Agent, or Firm*—Staas & Halsey LLP

[57] ABSTRACT

A communication path establishment control module of a transmitting task transmits a communication path establishment request message to a communication path establishment control module of a receiving task. At this time, if the receiving task is not activated, a communication destination monitoring module transmits a failure-of-establishment notification to the transmitting task, and makes a system console display a destination information of a receiving task which is not activated. The transmitting task, when receiving the failure-of-establishment notification, registers a waiting state in a wait-for-activation list. An auto program activation module, when detecting destination information outputted by the system console, activates a receiving-side communication job. A receiving task that is thereby generated notifies the receiving-side control task of the activation. The receiving-side control task transmits an activation notification message to a transmitting-side control task. The transmitting-side control task notifies the transmitting task of the activation. The transmitting task retransmits a communication path establishment request message in accordance with this activation notification.

7 Claims, 13 Drawing Sheets

FIG. 10

| TRANSMITTING TASK NAME (COMID) | RECEIVING SYSTEM NAME (PSYS) | RECEIVING TASK NAME (COMID) |
|---|---|---|
| ACM00 | PSYS1 | ACM00 |
| ACM00 | PSYS1 | ACM01 |
| ACM01 | PSYS1 | ACM01 |
| ACM01 | PSYS2 | ACM03 |
| ⋮ | ⋮ | ⋮ |

FIG. 11

| MESSAGE | PROCESS |
|---|---|
| COMMUNICATION JOB NON-ACTIVATED | RECEIVING-SIDE CONTROL TASK ACTIVATED |
| ⋮ | ⋮ |

FIG. 12

| RECEIVING TASK ID (COMID) | TRANSMITTING SYSTEM INFORMATION | | | |
|---|---|---|---|---|
| | TARGET SYSTEM NAME | TARGET SYSTEM NAME | TARGET SYSTEM NAME | TARGET SYSTEM NAME |
| ACM00 | PSYS3 | PSYS4 | — | — |
| ACM01 | PSYS3 | PSYS4 | PSYS5 | PSYS6 |

FIG. 13

| LD NAME | INFORMATION OF TRANSMITTING DESTINATION ||
| --- | --- | --- |
| | TARGET SYSTEM NAME | TRANSMITTING DESTINATION |
| LD01 | PSYS1 | ACM00 |
| LD02 | PSYS1 | ACM01 |
| LD03 | PSYS2 | ACM00 |
| ⋮ | ⋮ | ⋮ |

FIG. 14

| COMMUNICATION CONTROL MODULE | TYPE:01 | NAME OF DESTINATION | PSYS NAME + COMID |
| --- | --- | --- | --- |

FIG. 15

| COMMUNICATION CONTROL MODULE | TYPE:02 | NAME OF DESTINATION | USER DATA |
| --- | --- | --- | --- |

INTER-COMPUTER COMMUNICATION SYSTEM

BACKGROUND OF THE INVENTION

1. Field of the Invention

The present invention relates generally to an inter-computer communication system for performing communications between a plurality of computer systems connected to each other via communication lines. The present invention relates more particularly to an inter-computer communication system capable of automatically taking activation synchronism of respective computer systems.

2. Description of the Prior Art

A user system such as LAN (local Area Network) has hitherto been decentralized for making the communications attainable between remote places as well as for decentralizing a load on a host computer. This decentralized system has the following construction. A plurality of host computers are installed, and LAN is provided under each host computer. The respective host computers are connected using a WAN (Wide Area Network), such as a public network or a private line, and the communications between terminals belonging to respective LANs can communicate with each other through the respective host computers. Note that the host computer is also termed a "computer system" or simply a "system".

In such a decentralized system, when inter system communications is performed, both communication jobs, including a transmitting task of a transmitting-side system, and a receiving task of a receiving-side system, must be activated. A word "activation synchronism" connotes herein that both the communication job of the transmitting-side system and the communication job of the receiving-side system are activated. Under such circumstances, a question arises concerning how to take the activation synchronism between the respective systems.

In this respect, according to a conventional decentralized system, for instance, operators of respective systems contact each other on phones in order to establish communication paths by taking the activation synchronism between the respective systems, thus respectively activating the communication jobs beforehand. Otherwise, the operator of the transmitting-side system confirms that the receiving task of the receiving-side system is activated in advance, and thereafter activates the transmitting task of the transmitting system.

Note that if the receiving task of the receiving-side system is not activated while the transmitting task of the transmitting-side system is activated, the transmitting-side system must retry to establish the communication path through polling until the receiving task of the receiving-side system is activated.

In recent years, the decentralized system is going to spread not only between large-sized general-purpose computers but also between small-sized computers such as work stations and personal computers. It is therefore difficult take the activation synchronism between the transmitting-side system and the receiving-side system due to a difference in operation time zone which is attributed to a difference in type between computers. More specifically, in general, the large-sized general-purpose computer is operated so that the communication job stops once per week for maintenance and inspection. In contrast with this, in general, the small-sized computer is operated so that the communication job stops at night time every day. Accordingly, when the transmitting-side host computer is the large-sized general-purpose computer, and the receiving-side host computer is the small-sized computer, if the communication is performed at night, the receiving task of the receiving-side system can not be previously activated, and therefore the activation synchronism between the systems is hard to be taken.

Further, in such a case that the transmitting-side system executes a retrying process (that is, poling) for establishing the communication path until the receiving task of the receiving-side system is activated, if the WAN for connecting the respective systems is a public network, futile line using charges must be paid until the communication path is established.

SUMMARY OF THE INVENTION

It is a first object of the present invention, which was contrived in view of the above problems, to provide an inter-computer communication system capable of automatically activating a receiving task (receiving. module) of a receiving-side system in response to an activation request from a transmitting-side system.

Further, it is a second object of the present invention to provide an inter-computer communication system capable of automatically establishing a communication path between two computer systems.

To accomplish the first object, according to a first aspect of the present invention, an inter-computer communication system transmits data between transmitting means of a first computer system for transmitting data and receiving means of a second computer system for receiving the data. The first computer system includes an activation requesting module for requesting an activation of the receiving module. The second computer system includes an activating module for activating the receiving module by detecting the activation request made by the activation requesting module.

In the thus constructed inter-computer communication system, in advance of transmitting the data, the activation requesting module of the first computer system requests the second computer system for activating the receiving module. The activating module of the second computer system activates the receiving module in response to this activation request.

The second computer system may include a plurality of receiving modules each having a unique identifier. In this case, the activation requesting module specifies a receiving module as a target of the activation request by designating the identifier. Further, the activating module activates the receiving module having the identifier designated by the activation requesting module.

Also, each of the computer systems may have a unique system name, and the activation requesting module specifies a computer system provided with the receiving module as the target of the activation request by designating the system name. With this construction, even if a plurality of second computer systems are provided, it is possible to easily specify the receiving module of the computer system designated as a destination of data transmitting.

Moreover, according to a second aspect of the present invention, an inter-computer communication system transmits data via a communication path established between a transmitting module of a first computer system for transmitting data and a receiving module of a second computer system for receiving the data. The first computer system comprises a requesting module for executing a request for establishing the communication path to the second computer system, and a reexecuting module for making the requesting module reexecute the request for establishing the communication path in accordance with a notification given from the second computer system. Further, the second computer system comprises an activating module for activating, if the receiving module is not yet activated at the time when the requesting module requests the establishment of the communication path, the receiving module. The second computer system also comprises a notifying module for giving the reexecuting module the notification if the activating module activates the receiving module, and the responding module for responding the establishment of the communication path to the first computer system if the receiving module has already been activated at the time when the requesting module execute the request for establishing the communication path.

The second computer system may include a plurality of receiving modules, each having a unique identifier. In this case, the requesting module specifies the communication path connected to a receiving module having an identifier by designating the identifier. Further, the activating module activates only the receiving module having the designated identifier. Moreover, the notifying module notifies the identifier of the activated receiving module. The responding module responds, only when the receiving module having the designated identifier has already been activated, the establishment of the communication path to the first computer system.

Furthermore, each of the computer systems has a unique system name. In this case, the requesting module specifies a computer system as a target of the request for establishing the communication path by designating the system name. With this construction, even if there are a plurality of second computer systems, the receiving module of the computer system that is a designated as the destination can be easily specified.

Further, the reexecuting module may make the requesting module reexecute the request for establishing the communication path with respect to only the communication path connected to the receiving module having the identifier notified by the notifying module. With this construction, it is feasible to eliminate troublesomeness of reexecuting the request for establishing the communication path relative to the receiving-side system that has previously been activated.

Furthermore, the first computer system may include a plurality of requesting modules each having a unique identifier. In this case, it is effective that the inter-computer system communication system further comprises a table for registering the identifier of the requesting module which has executed the request for establishing the communication path, without response of the establishment of the communication path. With this construction, the reexecuting module can make, only the requesting module having the identifier registered in the table, reexecute the request for establishing the communication path.

According to a third aspect of the present invention, a computer system can be used in the inter-computer communication system capable of accomplishing the first and second objects given above. To be specific, the computer system according to the third aspect of the present invention receives data transmitted from another computer system via a communication path established between the computer system and the other computer system. This computer system comprises a receiving module for receiving the data when said receiving means is activated, and an activating module for activating, if the receiving module is not yet activated at the time when establishment of the communication path is requested by the other computer system, the receiving module. The computer system also comprises a notifying module for notifying, when the activating module activates the receiving module, the other computer system of the activation of the receiving module, and a responding module for responding to the establishment of the communication path to the other computer system if the receiving module has already been activated at the time when the establishment of the communication path is requested by the other computer system.

According to the computer system thus constructed, if the receiving module is not yet activated at the time when the establishment of the communication path is requested by other computer system, the activating module activates this receiving module. When the receiving module is thus activated, the notifying module notifies the other computer system of the activation and makes it again request the establishment of the communication path. In accordance with this, when the establishment of the communication path is again requested by other computer system, the receiving module has already been activated. Therefore, the responding module responds to the establishment of the communication path to other computer system. Thus, even if there is no repeated poling from the the other computer system, other computer system can be promoted to make the request for establishing the communication path by automatically activating the receiving module.

As explained above, according to the inter-computer communication system of the present invention, the receiving module of the receiving-side system can be automatically activated in response to the activation request given from the computer system having the transmitting module. Further, according to the second aspect of the present invention, the communication path between the systems can be automatically established.

BRIEF DESCRIPTION OF THE DRAWINGS

The present invention will become more fully understood from the detailed description given hereinbelow and the accompanying drawings, in which:

FIG. 10 is a diagram showing a structure of a wait-for-activation list;

FIG. 11 is a diagram showing a structure of a processing list;

FIG. 12 is a diagram showing a structure of a receiving management list;

FIG. 13 is a diagram showing a structure of a transmitting management list,

FIG. 14 is a diagram showing a structure of a communication path establishment request message/activation notification message;

FIG. 15 is a diagram showing a structure of a normal message;

DESCRIPTION OF THE PREFERRED EMBODIMENT

An embodiment of the present invention will hereinafter be described with reference to the accompanying drawings.
<Principle of Embodiment>

Figure 1:
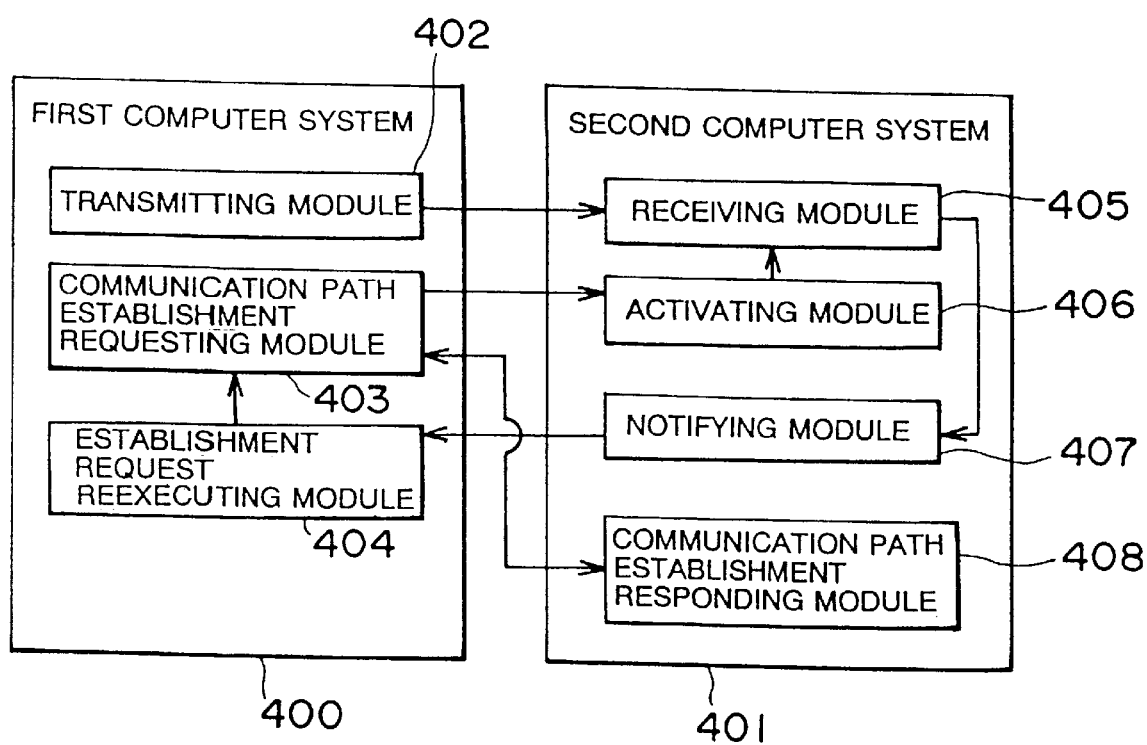
FIG. 1 is a diagram showing the principle of an embodiment of the present invention.

To start with, a principle of the embodiment of the present invention will be hereinbelow explained. FIG. 1 is a diagram illustration the principle of an inter-computer communications system in this embodiment. As shown in FIG. 1, a communication path establishment request module 403 within a first computer system 400 requests a second computer system 401 for establishing a communication path. At this time, if a receiving module 405 is not yet activated within the second computer system 401, an activating module 406 activates this receiving module 405. When the receiving module 405 is thus activated, a notifying module 407 notifies an establishment request reexecuting module 404 within the first computer system 400 that the receiving module 405 has been activated. The establishment request reexecuting module 404 within the first computer system 400 makes the communication path establishment request module 403 reexecute the communication path establishment request in response to that above notification. When the communication path establishment request module 403 has reexecuted the communication path establishment request, the receiving module 405 has been invariably activated, and therefore a communication path establishment response module 408 makes a response of the communication path establishment to the first computer system 400. The communication path is thereby established, and hence a transmitting module 402 within the first computer system 400 is capable of transmitting data to the receiving module 405 within the second computer system 401. Thus, the maximum number of the communication path establishment requests made by the first computer system 400 in order to establish the communication path is two. Accordingly, it is feasible to obviate a complication of repeatedly performing the polling from the first computer system 400 and a laborious manual operation by an operator.
<Whole Construction of System>

Figure 2:
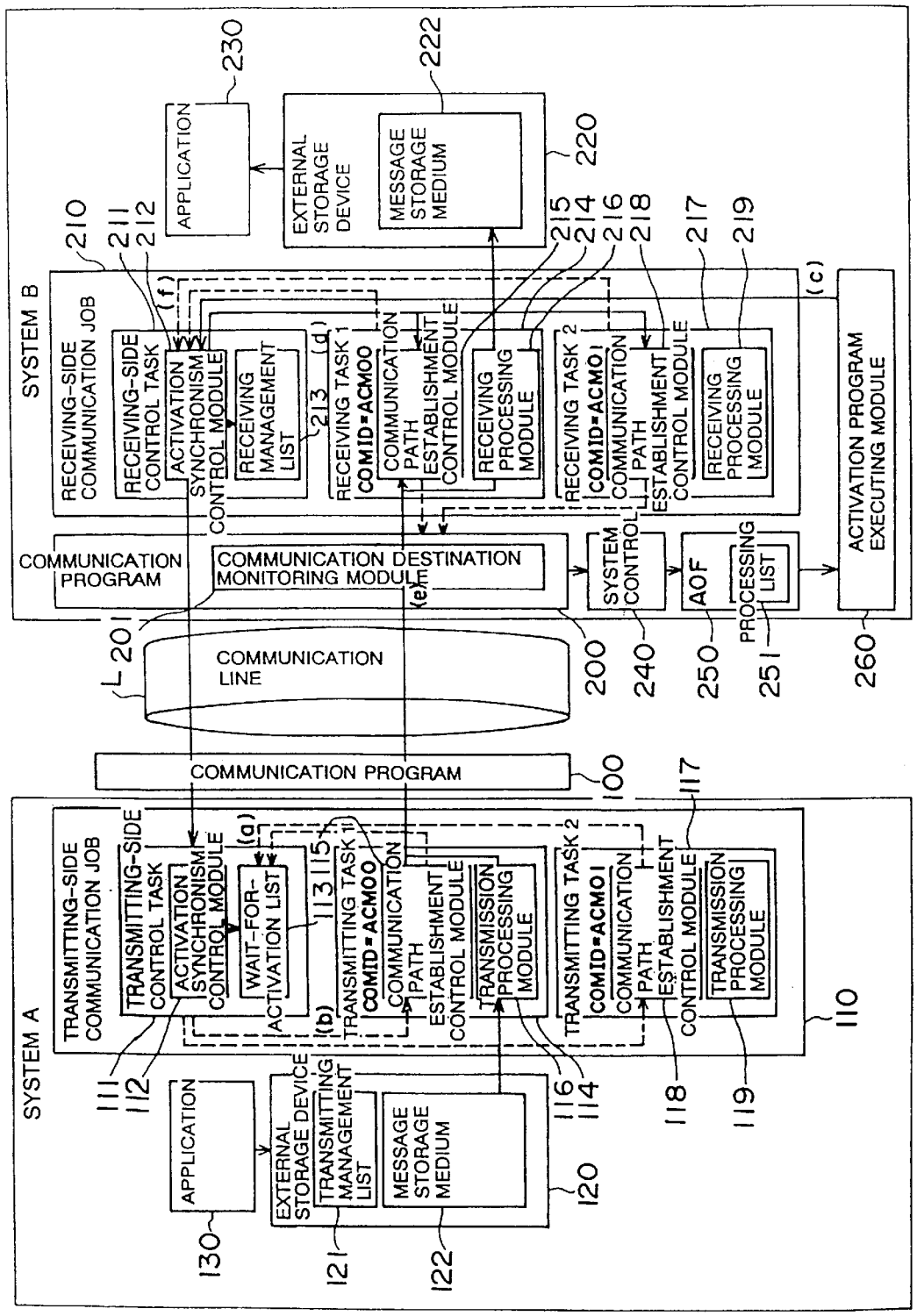
FIG. 2 is a block diagram schematically showing an inter-computer communication system in the embodiment of the present invention.

FIG. 2 is a block diagram schematically illustrating the inter computer system communications system in accordance with this embodiment. Referring to FIG. 2, this inter computer system communications system is constructed of a transmitting-side computer system (hereinafter simply termed a "transmitting-side system") A and a receiving-side computer system (hereinafter simply termed a "receiving-side system") B. These systems A and B are connected through a communication line L. Note that only functions of the transmitting-side system with respect to the system A will be explained, while only functions of the receiving-side system with respect to the system B will be explained for making understanding easier in the following discussion. As a matter of fact, however, each system incorporates the functions of the transmitting-side system and the functions of the receiving-side system in combination.

The respective systems A and B are host computers each having a LAN under the control thereof. The respective systems A and B include hardware of unillustrated CPUs (Central Processing Units), unillustrated main storage devices and external storage devices 120, 220. Then, a set of programs loaded down into the unillustrated main storage device are executed by the unillustrated CPU, whereby a variety of functions described in FIG. 2 can be actualized. This set of programs include communication programs 100, 200, applications 130, 230, and communication jobs (a transmitting-side communication jobs 110, and a receiving-side communication job 210).

The applications 130, 230 include all kinds of application programs herein defined as a data creation program (the system A-side application 130) and a data viewer program (the system B-side application 230).

According to the system A-side application 130, various items of data generated are attached with logic addresses (LD) and stored on a message storage medium 122 within the external storage device 120. This external storage device 120 is also stored with a transmission management list 121. This transmission management list 121 is, as shown in FIG. 13, a table in which the logical addresses (LD) of the respective items of data stored on the message storage medium 122 are made to correspond to information (that is, a name of target system and a name of receiving task) about a destination of transmission corresponding to the logical address.

The transmitting-side communication job 110 consists of a transmitting-side control task 111 and a plurality (only two are illustrated in FIG. 2) of transmission tasks 114, 117. The transmitting-side communication job 110 functions to fetch the data stored on the message storage medium 122 and transmit the fetched data toward the receiving-side system (system B).

To explain more specifically, the respective transmission tasks (transmitting modules) 114, 117 incorporate a function of communication path establishment control modules 115, 118 and a function of transmission processing modules 116, 119.

These communication path establishment control modules (an activation request module and a communication path establishment request module) 115, 118 are defined as functions to establish communication paths between own transmission tasks 114, 117 and transmission destinations (receiving tasks 214, 217 in communication jobs 210 in other system) of the data stored on the message storage medium 122. To establish these communication paths, the communication path establishment control modules 115, 118 transmit an establishment request message having a structure shown in FIG. 14 to the destination system of data transmission. Written in a "name of destination" of this establishment request message is a name of receiving task as the destination of data transmission.

The respective communication path establishment control modules 115, 118 register an effect of waiting for the activation in a wait-for-activation list 113 of the transmitting-side control task 111 with respect to the communication paths that could not be established because of the receiving task as the destination being non-activated (see an arrowhead (a)). Then, after waiting for the activation of that receiving task, the establishment of that communication path is retried. Note that the transmitting tasks 114, 117 individually have unique names (COMID: transmitting task 114=ACM00, transmitting task 117=ACM01), and therefore, registers the effect of waiting for the activation in the waiting-for-activation list 113 by use of this transmitting task name.

The transmission processing modules 116, 119 fetch the data stored on the message storage medium 122 and read, out of the transmission management list 121, the information (that is, the name of the target system, and the name of the receiving task) of destination corresponding to the logic address (LD) of this item of data. Then, this item of data and the information of destination are edited as a message (normal message) taking a form shown in FIG. 15. Subsequently, this normal message is transmitted to the receiving tasks 214, 217 as the destination via the communication paths established by the communication path establishment control modules 115, 118. The transmission processing modules 116, 119, when receiving a reply showing such an effect that the message transmitted is stored on the message storage medium 122 within the destination system (the system B) of the data transmission, erase the data corresponding to this message from the message storage medium 122 of the system A.

Note that the respective transmitting tasks 114, 117 establish the communication paths with a plurality of receiving tasks as the destinations and transmit the corresponding data toward the respective receiving tasks as the destinations. In this situation, the plurality of receiving tasks might belong to the same system or to separate systems, respectively.

The transmitting-side control task (an establishment request reexecuting module) 111 generates and controls the respective transmitting tasks 114, 117. The transmitting-side control task 111 includes an activation synchronism control module 112 in addition to the above-mentioned waiting-for-activation list 113.

Written in this waiting-for-activation list 113 are, as shown in FIG. 10, the task names (COMID) of the transmitting tasks 114, 117, and the receiving system names (PSYS names) and the receiving task names (COMID) of the receiving tasks 214, 217 for which activation the transmitting task 114, 117 is waiting to be activated, for every transmitting tasks 114, 117 within the self transmitting-side communication job 110. Note that the receiving task name is unique in each system and therefore might happen to be the same as the transmitting task name. However, the receiving system name is unique for every system, and hence the respective receiving tasks 214, 217 can be specified by a combination of the receiving task name and the receiving system name.

The activation synchronism control module 112, when having an activation notifying message from another system (the system B), refers to the waiting-for-activation list 113 in accordance with the combination of the receiving system name (the PSYS name) and the receiving task name (COMID) that are written in this activation notifying message. The activation synchronism control module 112 thus seeks the transmitting tasks 114, 117 waiting for the receiving tasks 214, 217 corresponding to that combination. Then, activation synchronism control module 112 notifies the sought transmitting tasks 114, 117 of the activation of the receiving tasks 214, 217 (see arrow (b)). Note that the activation synchronism control module 112 establishes itself in the communication program 100 by designating its own destination (ID) when it is activated.

The system A-side communication program 100 functions as an interface between the transmitting-side communication job 110 and the communication line L. The communication program 100 works to edit the respective messages (the activation request message, and the normal message) notified from the transmitting-side communication job 110 in a predetermined communication data format, and these edited messages are transmitted toward the receiving-side system (the system B) via the communication line L. Further, according to the communication program 100, the message (the activation notifying message) received from the receiving-side system (the system B) is converted into a format that can be processed by the transmitting-side communication job 110 and then transferred to the transmitting-side communication job 110.

The communication line L is a public communication network such as an ISDN, wherein a plurality of communication path can be set within a single or a plurality of physical communication lines.

On the other hand, the system B-side communication program 200 functions as an interface between the receiving-side communication job 210 and the communication line L. The communication program 200 works to convert the respective messages (the activation request message, and the normal message) received from the transmitting-side system (the system A) into a format that can be processed by the receiving-side communication job 210 and then transferred to the receiving-side communication job 210. Further, the communication program 200 works to edit the message (the activation notifying message) notified from the receiving-side communication job 210 in a predetermined communication data format, and the edited message is transmitted toward the transmitting-side system (the system A) via the communication line L Note that the communication program 200 incorporates a communication destination monitoring module 201. This communication destination monitoring module 201, when the respective receiving tasks 214, 217 of the receiving-side communication job 210 are activated, receives a notice of this activation from the receiving tasks 214, 217. Accordingly, the communication destination monitoring module 201 always recognizes which task of the receiving tasks 214, 217 is capable of receiving the notice. The communication destination monitoring module 201, when receiving the activation request message addressed to the specified receiving tasks 214, 217 from one of the transmitting tasks 114, 117 of the transmitting-side system (the system A), replies an "establishment notice (if the receiving task is activated)" or an "establishment failure notice (if the receiving task is not yet activated)" to the transmitting tasks 114, 117 in accordance with a status of the receiving tasks 214, 217. The "establishment notice" and the "establishment failure notice" contain an indication of a combination of the system name (PSYS name) and the task name (COMID) in order for the transmitting task 114, 117 to specify the receiving tasks 214, 217 connected to the communication path with a success or failure of the establishment. Then, the "establishment notice" is given, thereby the communication paths between the corresponding transmitting tasks 114, 117 and the receiving tasks 214, 217 is established. The above-described communication destination monitoring module 201 constitutes the communication path establishment responding module.

The communication destination monitoring module 201, if the receiving tasks 214, 217 as the destination of the activation request message are not yet activated, also notifies a system console 240 of information showing that the non-activated receiving tasks 214, 217 exist.

This system console 240 is a display device (hardware) for displaying a message showing that the non-activated receiving tasks 214, 217 exist in accordance with the information given from the communication destination monitoring module 201 of the communication program 200.

The message displayed on the system console 240 is monitored by an auto program activation module (AOF) 250. This auto program activation module (AOF) 250 is a function generated by the unillustrated CPU executing the program in the receiving-side system (the system B). Then, the auto program activation module (AOF) 250 reads, from a processing list 251, a process corresponding to the message displayed on the system console 240. This processing list 251 is, as shown in FIG. 11, a list in which processes (macro) corresponding to the respective messages are written. Written in the processing list 251 is, e.g., a process for activating (reactivating) the receiving-side communication job 210, corresponding to a message of "communication job (receiving task) non-activated".

The process read by the auto program activation module (AOF) 250 from the processing list 251 is executed by an activation program executing module 260. This activation program executing module 260 is a function generated by the unillustrated CPU executing the program in the receiving-side system (the system B). Then, when the activation program executing module 260 executes the process for activating (reactivating) the receiving-side communication job 210, the receiving-side control task (a notifying module and an activation notifying module) 211 constituting the receiving-side communication job 210 is first activated (see an arrow (c)). The thus activated receiving-side control task 211 generates the respective receiving tasks (receiving modules) 214, 217 forming the receiving-side communication job 210 together with the receiving-side control task 211 (see an arrow (d)). An activating module comprises the communication destination monitoring module 201, the system console 240, the auto program activation module (AOF) 250 and the activation program executing module 260.

The thus activated system B-side transmitting-side communication job 210 stores a message received from the transmitting side system (the system A) on a message storage medium 222 built in the system B-side external storage device 220.

To explain more specifically, the respective receiving tasks 214, 217 function as communication path establishment control modules 215, 218 and also function as receiving processing modules 216, 219.

The communication path establishment control modules 215, 218 are defined as functions for establishing the communication path between own receiving tasks 214, 217 and the transmitting tasks 114, 117 which designate the own receiving tasks 314, 217 as destinations of the data transmission. For establishing the communication path, each communication path establishment control module 215, 218 establishes itself in the communication program 200 by designating its own destinations (COMID) when generating the own receiving tasks 214, 217 (see an arrow (e)). Further, the communication path establishment control modules 215, 218, after establishing itself in the communication program 200, notify the receiving-side control task 211 of the activation (see an arrow (f)).

The receiving processing modules 216, 219 store the message storage medium 222 within the external storage device 220, with the data in the normal message transmitted from the transmitting tasks 114, 117 of the transmitting-side system (the system A) via the communication path established by the communication path establishment control modules 215, 218. Incidentally, as discussed above, the receiving processing modules 216, 219, upon storing the message storage medium 222 with the data in the normal message, makes a response, showing that the data are stored on the message storage medium 222, to the transmitting tasks 114, 117 of the transmitting-side system (the system A).

Thus, the data stored on the message storage medium 222 within the external storage device 220 is fetched by the application 230.

The receiving-side control task 211 generates and controls the respective receiving tasks 214, 217. The receiving-side control task 211 includes an activation synchronism control module 212 and a receiving management list 213.

As illustrated in FIG. 12, this receiving management list 213 is a list in which registering the task names (COMID) of the receiving tasks 214, 217, and the system names (PSYS names) of the transmitting system which transmits the data to the receiving tasks 214, 217 are preciously registered for every receiving tasks 214, 217 within the self receiving-side communication job 210.

The activation synchronism control module 212 reads out all the system names (PSYS names) registered as transmitting systems corresponding to the respective receiving tasks 214, 217 from the receiving management list 213 if the activation notices are given from all the receiving tasks 214, 217 at the time when generating the respective tasks 214, 217. Then, an activation modification message having a structure shown in FIG. 14 is transmitted to each transmitting system. The system name of the transmitting system is written in the area "destination name" of the activation notifying message, and the system name (PSYS name) of the system B and the task name (COMID) of the receiving task are written in a payload area.

As described above, the transmitting-side control task 111 of the transmitting-side system (the system A) receiving the activation notifying message seeks the transmitting tasks 114, 117 waiting for the activation of the receiving tasks 214, 217 written in the activation notification message from the waiting-for-activation list 113. Then, the transmitting-side control task 111 notifies the transmitting tasks 114, 117 of the activation, designating names of the activated receiving tasks.

<Processes In Respective Modules>

Given next is an explanation of processes executed by the respective modules constituting the inter-computer communication system in this embodiment.

[Transmitting-Side Control Task]

Figure 3:
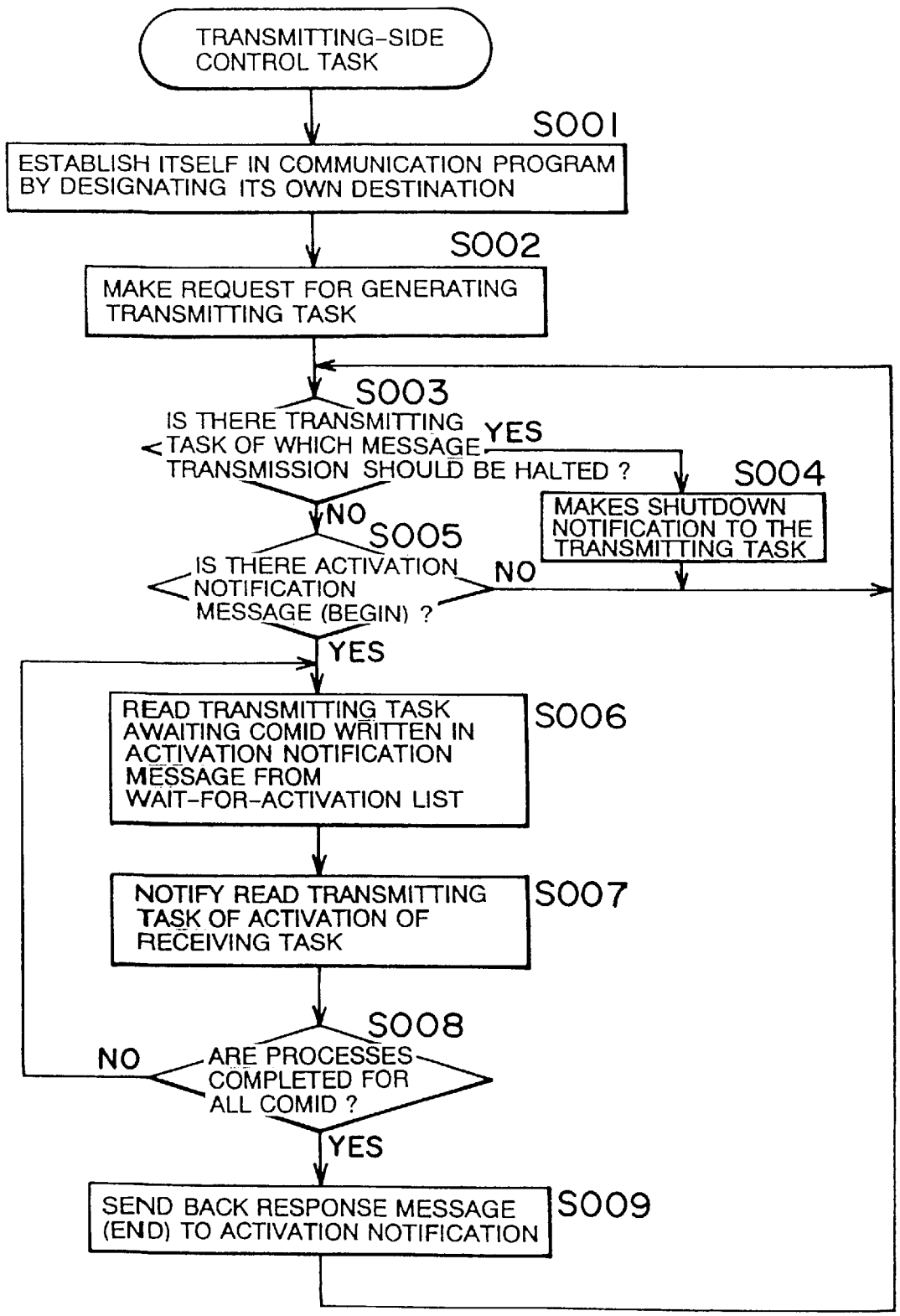
FIG. 3 is a flowchart showing processes executed by a transmitting-side control task.

FIG. 3 shows processes executed by the transmitting-side control task 111 within the transmitting-side communication job 110. These processes are executed when the transmitting-side control task 111 is activated by an operation of an operator. It is assumed that whole transmitting-side communication jobs 110 including the respective transmitting tasks 114, 117 are not yet activated, prior to the execution of these processes. Further, it is also assumed that the communication program 100 and the application program 130 have already been activated.

In first step S001 in the above processes, the transmitting-side control task 111 establishes itself in the communication program 100, designating its own destination (ID) managed by the communication program 100. As a result, the communication program 100 is hereafter capable of notifying a transmitting-side control task 111 of a message addressed to this transmitting-side control task 111.

In next step S002, the transmitting-side control task 111 requests the unillustrated CPU for generating the transmitting tasks 114, 117. The transmitting tasks 114, 117 are thereby generated, and all the functions the transmitting-side communication job 110 are prepared.

In next step S003, the transmitting-side control task 111 checks whether or not there is a transmitting task 114, 117 of which message transmission should be halted. This check is executed based on whether or not the data (the message) which is set to be transmitted to the transmitting task 114, 117 is given from the application 130 which had already halted the transmission of message. If there is a transmitting task 114, 117 of which message transmission should be halted, the transmitting-side control task 111 makes "shutdown notification" to the transmitting tasks 114, 117 in step S004, and the processing returns to step S003.

Whereas if there is not a transmitting task 114, 117 of which message transmission should be halted, the transmitting-side control task 111 checks whether or not it receives an activation notifying message (BEGIN) from the receiving-side control task 211 of the other system (the system B) in step S005. If the activation notification message is not received, the processing returns to step S003.

Whereas, if the activation notification message is received, in step S006, the transmitting-side control task 111 reads, from the waiting-for-activation list 113, a transmitting task 114, 117 corresponding to a combination of the system name (PSYS name) and the task name (COMID) that are written in the activation notification message. In this case, if the transmitting task 114, 117 corresponding to the above combination is not written in the waiting-for-activation list 113, the transmitting-side control task 111 executes nothing in step S006.

In next step S007, the transmitting-side control task 111 notifies the transmitting task 114, 117 read in step S006, of the activation of the receiving task 214, 217 for which the transmitting task 114, 117 wait.

In next step S008, the transmitting-side control task 111 checks whether or not the processes in steps S006 and S007 are completed with respect to all the combinations of the system names (PSYS names) and the task names (COMID) that are written in the activation notifying message. If the processes are not completed with respect to all the combinations thereof, the processing returns to step S006 to execute the process for a next combination of the system name (PSYS name) and the task name (COMID).

Whereas, if the processes in steps S006 and S007 are completed with respect to all the combinations of the system names (PSYS names) and the task names (COMID), the transmitting-side control task 111 makes the processing proceed to step S009. In step S009, the transmitting-side control task 111 sends a response message (END) to the activation notifying message received in step S005, back to the receiving-side control task 211 which has transmitted this activation notifying message. Thereafter, the transmitting-side control task 111 makes the processing return to step S003 to wait for the application 130 halting the transmission of the message or for a receipt of a new activation notifying message.

[Transmitting Task]

Figure 4:
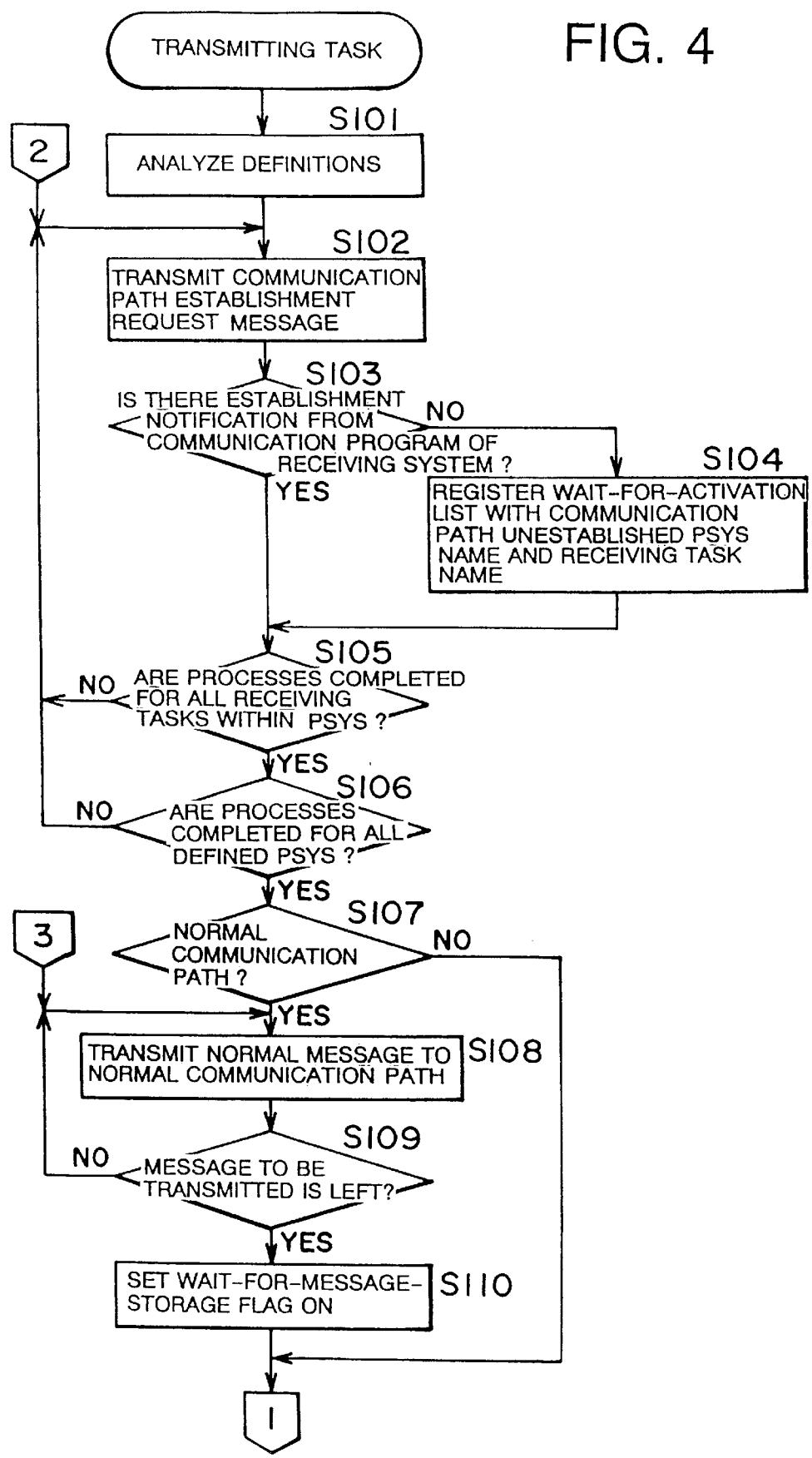
FIG. 4 is a flowchart showing processes executed by a transmitting task.
Figure 5:
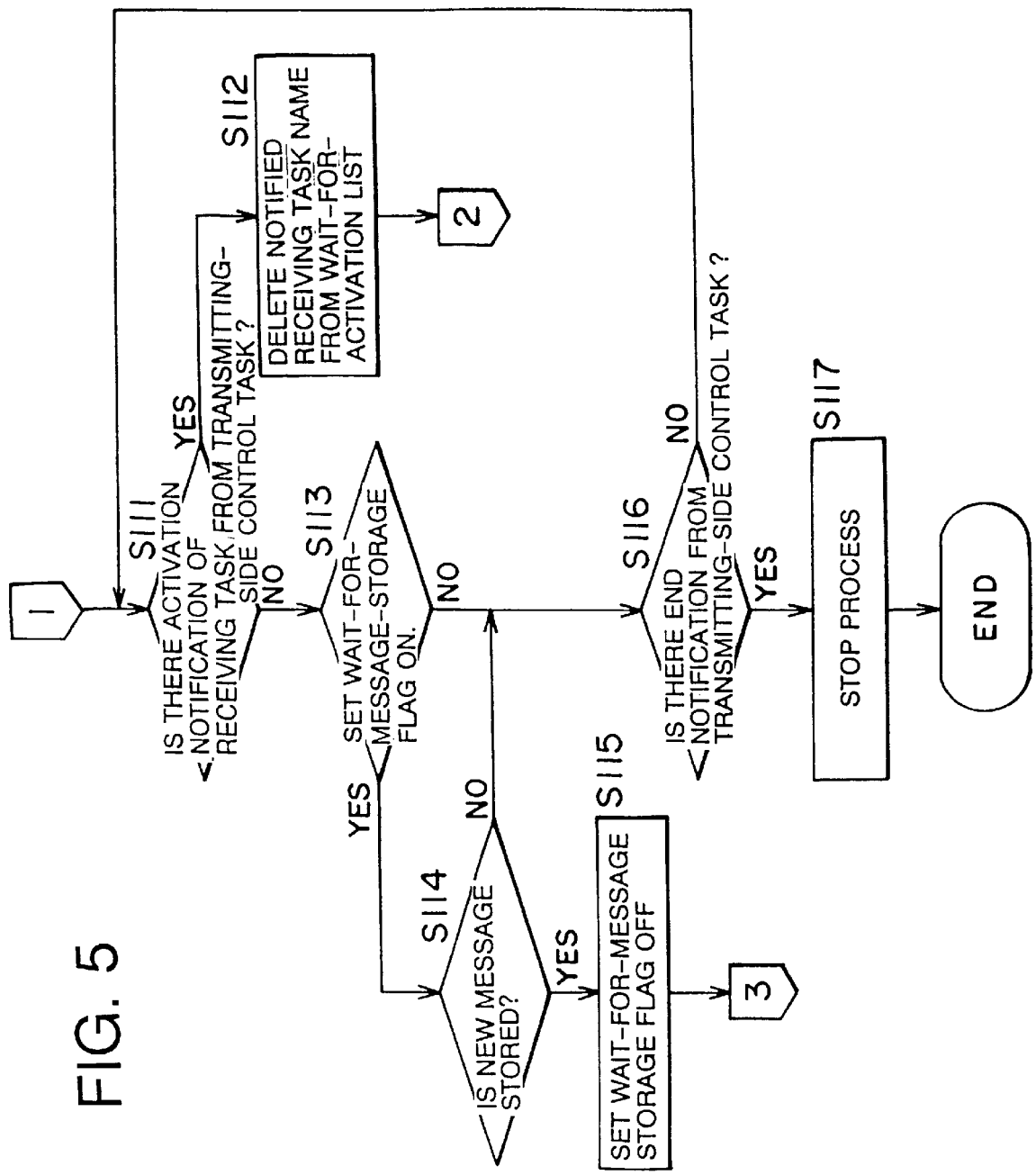
FIG. 5 is a flowchart showing processes executed by the transmitting task.

FIGS. 4 and 5 show the processes executed by the transmitting task 114, 117. These processes start when the transmitting-side control task 111 generates the transmitting task 114, 117 (S002 in FIG. 3). Then, in first step S101 after the start, the transmitting tasks 114, 117 interprets a definition. More specifically, the transmitting task 114, 117 refer to definitions (not shown) and sets the logic addresses (LD) attached to the messages that should be subjected to the transmitting process in its transmission processing module 116, 119, and combinations of the receiving task names 214, 217 and the system names (PSYS names) to which the messages are transmitted.

In next step S102, the transmitting task 114, 117 fetches one of the combinations of the receiving tasks 214, 217 and the system names (PSYS names) that are defined in step S101, and transmits the communication path establishment request message, with the thus fetched combination, of the system name (PSYS name) and the receiving task 214, 217 as a designation.

Checked in next step S103 is whether or not an establishment notification is received from the communication program 200 of the receiving-side system (the system B). If the establishment notification is not yet received, in step S104, the transmitting task 114, 117 registers, in the waiting-for-activation list 113, the combination of the task name (COMID) and the system name (PSYS name) as a destination of the communication path establishment request message transmitted in step S102, together with its own task name (COMID). When the registering process in step S104 is completed, the transmitting task 114, 117 makes the processing proceed to step S105. On the other hand, if the establishment notification is received in step S103, the transmitting task 114, 117 makes processing proceed directly to step S105.

In step S105, the transmitting task 114, 117 check whether or not the above processes in steps S102 through S104 are completed with respect to all the receiving tasks (COMID) in the same system (PSYS) defined in step S101. If the above processes are not yet completed with respect to all the receiving tasks (COMID), the processing returns to step S102. In this case, the transmitting task 114, 117 transmits the communication path establishment request message to the next receiving task (COMID) in the same system (PSYS) in step S102.

Contrastingly, if the above processes are completed with respect to all the receiving tasks (COMID) in step S106, the transmitting task 114, 117 checks whether or not the above processes in steps S102 through S104 are completed with respect to all the systems (PSYS) defined in step S101. If the above processes are not yet completed with respect to all the systems (PSYS), the processing returns to step S102. In this case, in step S102, the transmitting task 114, 117 transmits the communication path establishment request message to one of the receiving tasks (COMID) of the next system (PSYS).

Contrastingly, if the above processes are completed with respect to all the systems (PSYS), in step S107, the transmitting task 114, 117 checks whether or not there exists a normal communication path established by receiving the establishment notification. If there is no normal communication path, the transmitting task 114, 117 makes the processing proceed directly to step S111.

Whereas, if there is the normal communication path, the transmitting task 114, 117 reads the logic address (LD) of a data which should be transmitted to the destination of this communication path, referring to the transmitting management list 121 in step S108. Subsequently, the transmitting task 114, 117 reads the data having the read logic address (LD) from the message storage medium 122, converts the same data into a format of the normal message, and transmits the data to the receiving tasks 214, 217 as the destination via the relevant communication path.

In next step S109, the transmitting task 114, 117 checks whether or not the data (message) to be transmitted is still left on the message storage medium 122. If the data (message) to be transmitted is still left thereon, the transmitting task 114, 117 makes the processing return to step S108. Whereas, if the data (message) to be transmitted is not left, the transmitting task 114, 117 sets a wait-for-message-storage flag in step S110 and thereafter makes the processing proceed to step S111.

In step S111, the transmitting task 114, 117 checks whether or not the activation notification of the receiving task is given from the transmitting control task 111 (S007 in FIG. 3). If the activation notification is given, the transmitting task 114, 117 deletes the receiving task name (COMID) shown in the activation notification from the wait-for-activation list 113 in step S112. Thereafter, the transmitting task 114, 117 returns the processing to step S102 and retransmits the communication path establishment request message to the receiving task of which name (COMID) is shown in the notification.

Whereas, if there is no activation notification, in step S113, the transmitting task 114, 117 checks a status of the wait-for-message-storage flag. If the wait-for-message-storage flag is not set, the processing proceeds to step S116.

Contrastingly, if the wait-for-message-storage flag is set, in step S114, the transmitting task 114, 117 checks whether or not the message storage medium 122 is stored with a new piece of data (message). If stored with the new data (message), in step S115, the transmitting task 114, 117 resets the wait-for-message-storage flag, and the processing returns to step S108. Whereas, if not stored with the new data (message), the transmitting task 114, 117 makes the processing proceed to step S116.

In step S116, the transmitting task 114, 117 checks whether or not the shutdown notification is given from the transmitting-side control task 111. If the shutdown notification is not given, the processing returns to step Sill. Contrastingly, if the shutdown notification is given, the transmitting task 114, 117 executes the shutdown process of itself in step S117, thus finishing the processing.

<Communication Program of Receiving System>

Figure 6:
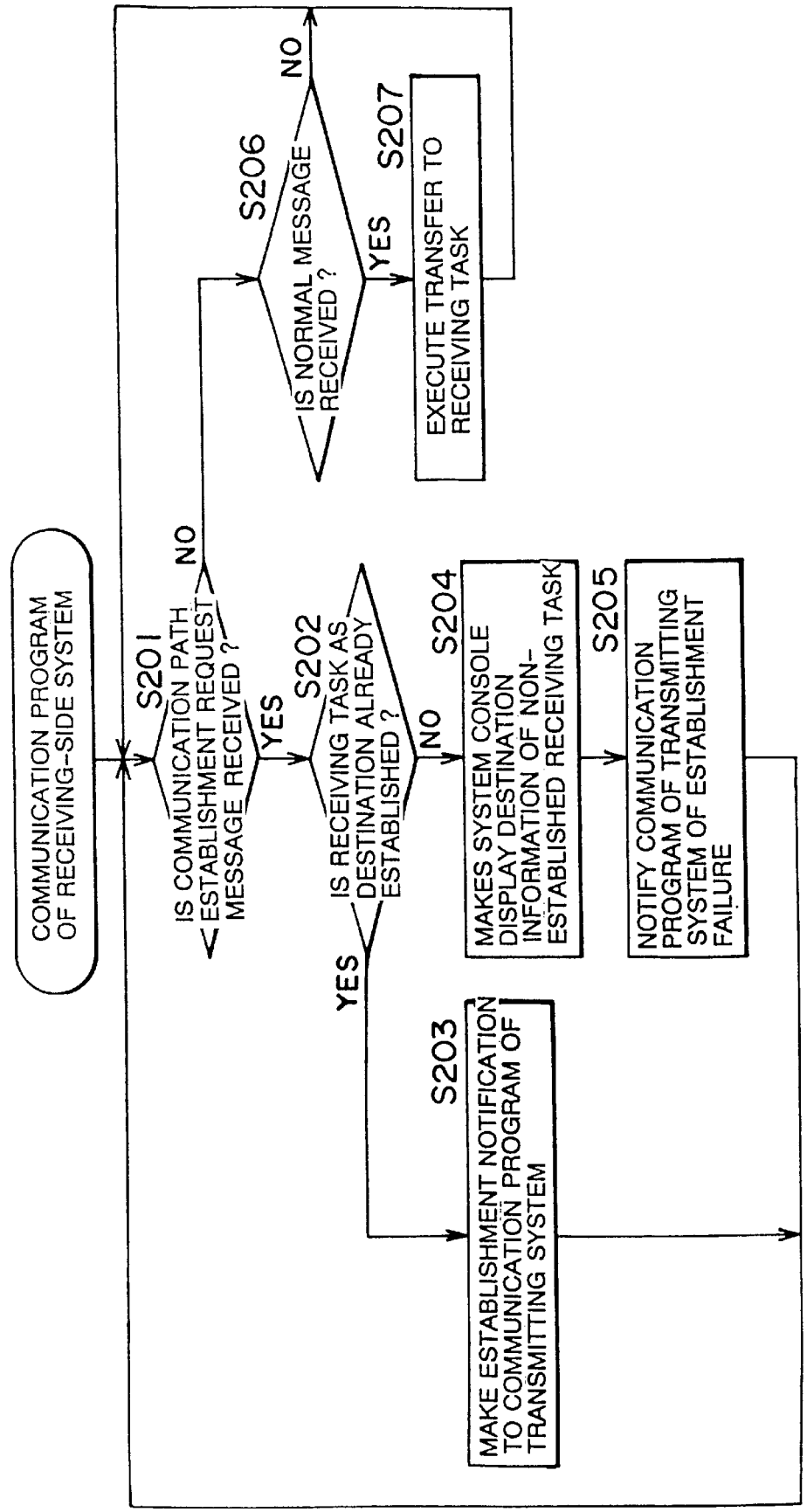
FIG. 6 is a flowchart showing processes executed by a communication program of a receiving-side system.

FIG. 6 shows the processes executed based on the communication program 200 of the receiving-side system (system B). This communication program is set to be automatically executed, synchronized with a start-up of the receiving-side system (system B).

In first step S201 in FIG. 6, the communication program 200 checks whether or not the communication path establishment request message is received from the transmitting-side system (system A). If the communication path establishment request message is received, the processing proceeds to step S202. Whereas, if the communication path establishment request message is not yet received, the processing proceeds to step S206.

In step S202, the communication program 200 checks whether the communication paths to the receiving task 214, 217 designated as destinations in the received communication path establishment request message have already been established. More specifically, the communication program 200 checks whether or not the receiving task 214, 217 designated as the destination has already been activated and notifies its COMID (destination). If the receiving task 214, 217 designated as the destination have already been activated, the communication program 200 notifies the communication program 100 of the transmitting-side system (system A) of the establishment in step 203, and thereafter the processing returns to step S201.

Whereas, if the communication paths td the receiving task 214, 217 designated as the destinations have not yet been established, the communication program 200 makes the system console 240 display the destination information (COMID) of the receiving task which is not yet activated in step S204. Then, in next step S205, the communication program 200 notifies the communication program 100 of the transmitting-side system (system A) of a failure of establishment, and the processing is returned to step S201.

On the other hand, in step S206, the communication program 200 checks whether or not a normal message is received from the transmitting-side system (system A). If a normal message is not yet received, the processing is returned directly to step S201. Whereas, if a normal message is received, the communication program 200 transfers the normal message to the receiving task 214, 217 designated as the destinations thereof in step S207, and the processing returns to step S201.

[Auto Program Activation Module (AOF)]

Figure 7:
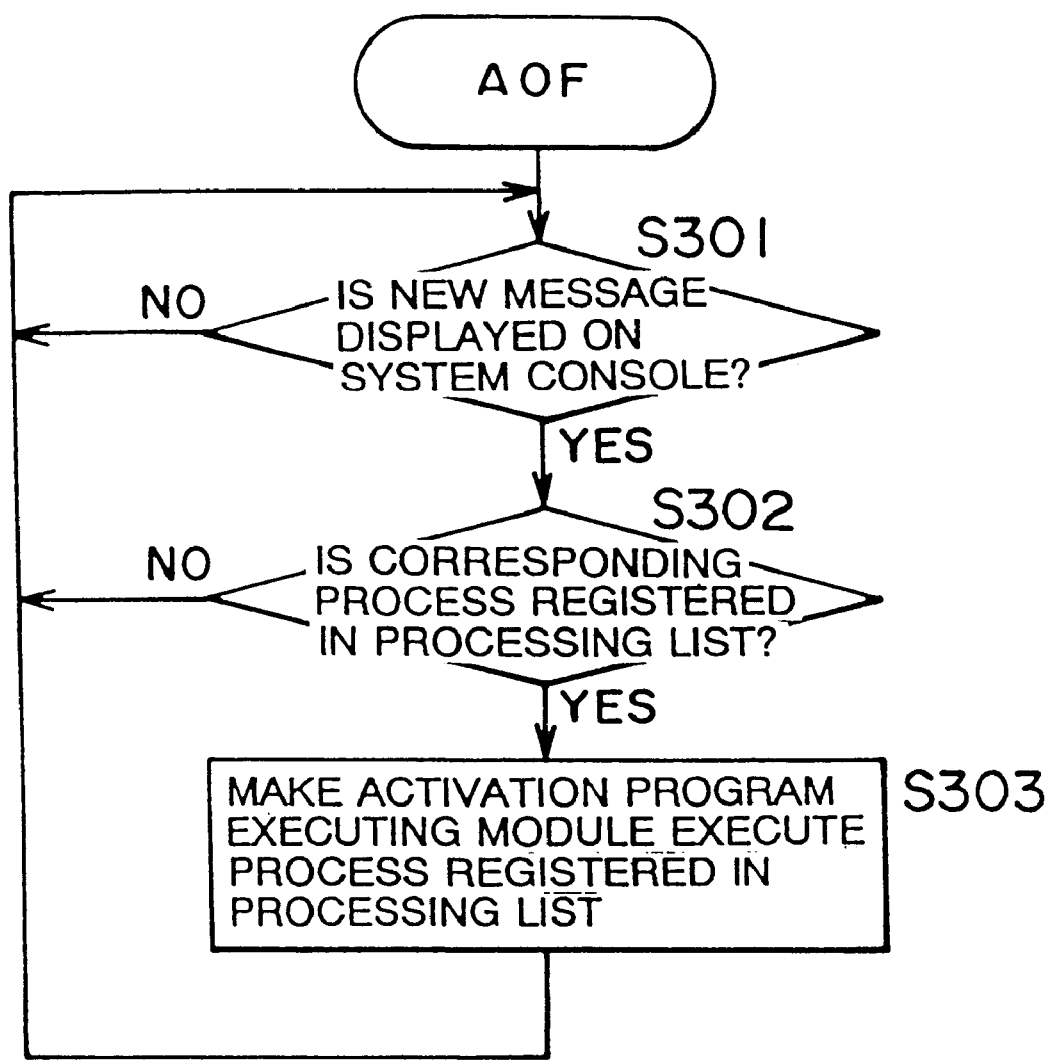
FIG. 7 is a flowchart showing processes executed in an auto program activation module.

FIG. 7 shows processes executed by an auto program activation module (AOF) 250. These process are set to be automatically executed, synchronized with the startup of the receiving-side system (system B).

Then, in first step S301 after the start, the auto program activation module (AOF) 250 checks whether or not a new message is displayed on the system console 240. Then, the auto program activation (AOF) 250 repeats this check until a new message is displayed thereon.

Contrastingly, if the new message is displayed thereon, in step S302, the auto program activation module (AOF) 250 checks whether or not the process corresponding to this message is registered in the processing list 251. If the process is not registered, the processing returns directly to step S301.

Whereas, if the process is registered, in step S303, the auto program activation module (AOF) 250 executes the process registered in the processing list 251 in the activation program executing module 260. For instance, if the destination information of the receiving task which is not yet activated is displayed on the system console 240 by the communication program 200 of the receiving-side system (see S204 in FIG. 6), the auto program activation module (AOF) 250 instructs the activation program executing module 260 to execute the process for activating the receiving-side control task 211. After executing the process in step S303, the auto program activation module (AOF) 250 makes the processing return to step S301 in order to monitor a next new message.

[Receiving-Side Control Task]

Figure 8:
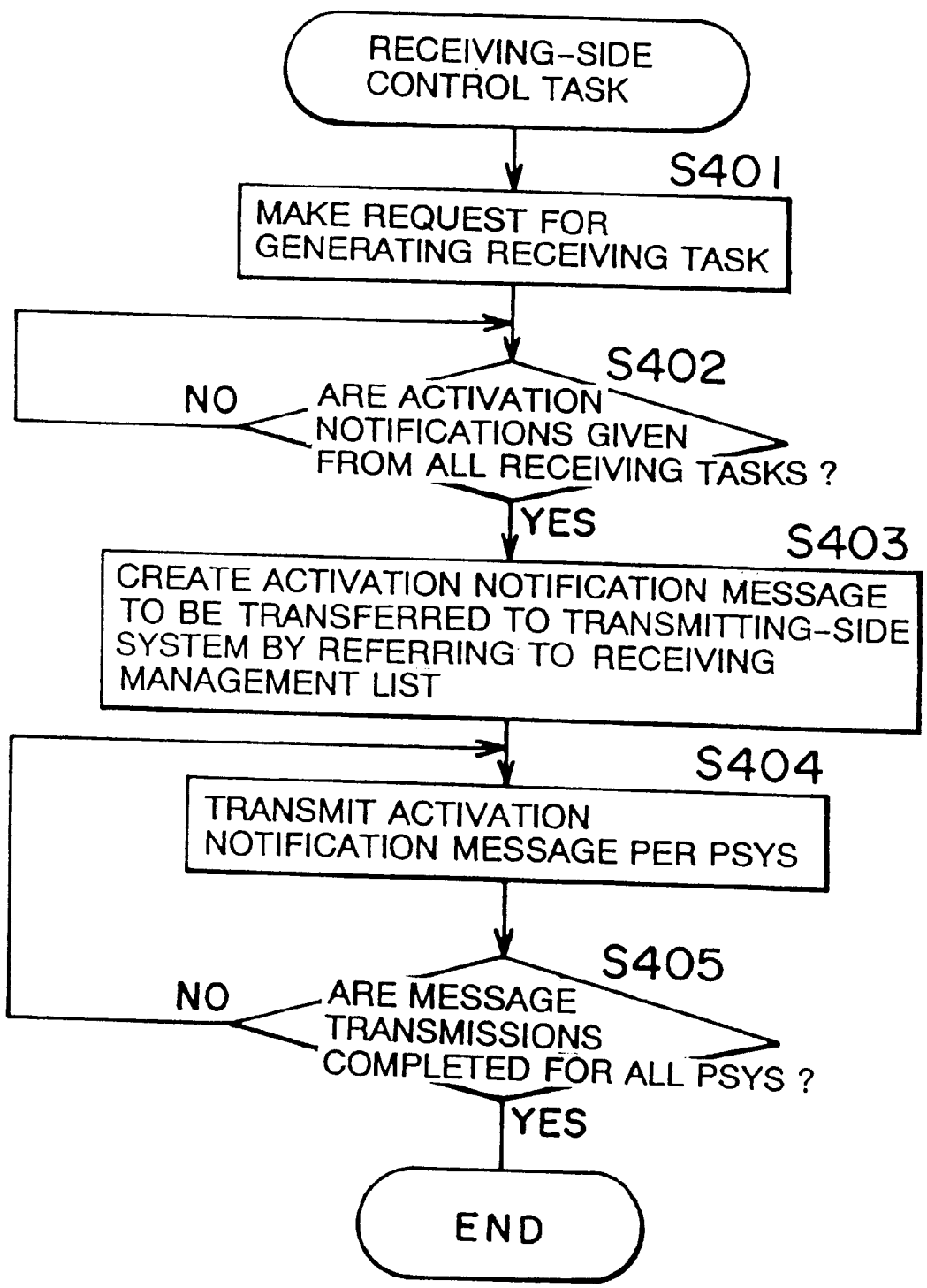
FIG. 8 is a flowchart showing processes executed by a receiving-side control task.

FIG. 8 show processes executed by the receiving-side control task 211. These processes start when the activation program executing module (AOF) 260 executes the activation program in accordance with a process executing instruction (S303 in FIG. 7) by the auto program activation module (AOF). Then, in first step S401 after the start, the receiving-side control task 211 requests the unillustrated CPU to generate the respective receiving tasks 214, 217.

In next step S402, the receiving-side control task 211 awaits the activation notifications transmitted from all the receiving tasks 214, 217 which are generated in response to the receiving task generation request in step S401. Then, the receiving-side control task 211, when the activation notifications from all the receiving tasks 214, 217 are prepared, makes the processing proceed to step S403.

In step S403, the receiving-side control task 211 refers to the receiving management list 213 and creates an activation notification message to be transferred to the transmitting-side system (system A). More specifically, the receiving-side control task 211 writes, in the message, the receiving task name (COMID) and the system name (PSYS name) of this receiving-side system (system B) for every receiving task, and attaches a target system name (PSYS name) as a destination to this message.

In next step S404, the receiving-side control task 211 transmits the activation notification message to one of those systems designated by the target system names (PSYS name).

In next step S405, the receiving-side control task 211 checks whether the transmissions of the activation notification message transmissions to all the systems designated by the target system names (PSYS names) are completed. If the transmissions of the activation notification messages to all the systems designated by the target system names (PSYS names) are not yet completed, the receiving-side control task 211 makes the processing return to step S404, and transmits the activation notification message to a next system designated by the target system name (PSYS name). When the transmissions of the activation notification messages to all the target system names (PSYS names) are completed as a result of repeating a loop process of steps S404 and S405, the receiving-side control task 211 finishes this process.

[Receiving Task]

Figure 9:
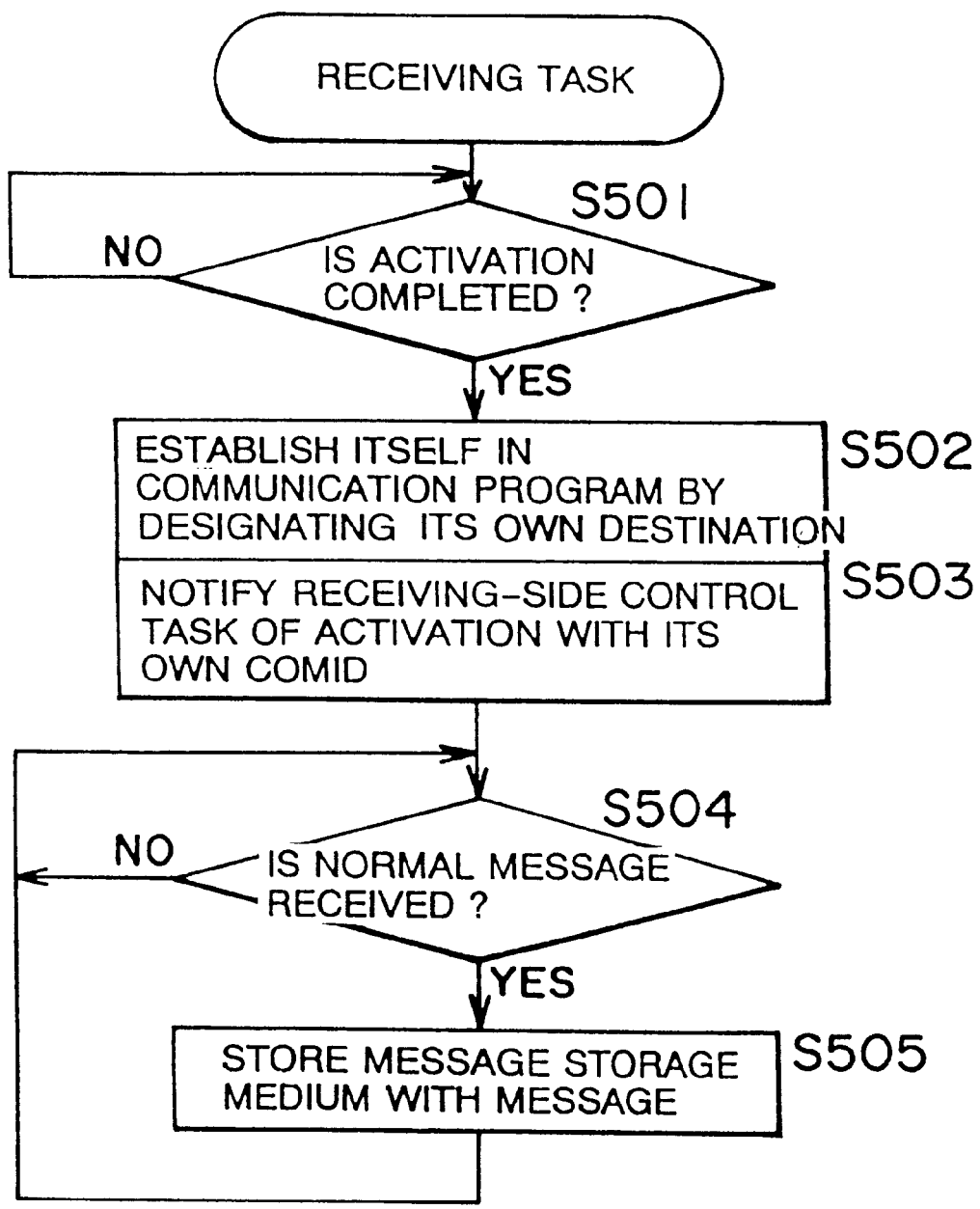
FIG. 9 is a flowchart showing processes executed by a receiving task.

FIG. 9 show processes executed by the receiving task 214, 217. These processes start when the receiving task 214, 217 is generated by the receiving-side control task 211 (S401 in FIG. 8). Then, in first step S501 after the start, the receiving task 214, 217 awaits a completion of activation of itself. Subsequently, upon the completion of the activation, in step S502, the receiving tasks 214, 217 establishes itself in the receiving-side system by designating its own destinations (COMID). Simultaneously, in step S503, the receiving task 214, 217 notifies the receiving-side control task 211 of the activation of itself, declaring its own COMID. This activation notification is checked in step S402 in FIG. 8.

In next step S504, the receiving task 214, 217 waits for receiving the normal message via the communication program 200. When receiving the normal message, the receiving task 214, 217 stores the message storage medium 222 with the received normal message in step S505. Thereafter, the receiving task 214, 217 makes the processing return to step S504 to await a next normal message.

<Operation of Embodiment>

Next, the operation of this embodiment having the above-described construction will be explained with reference to FIGS. 16 through 18. An explanatory premise is that the transmitting-side system (system A) is completely activated upon a start of the processes in FIGS. 3 to 5.

Figure 16:
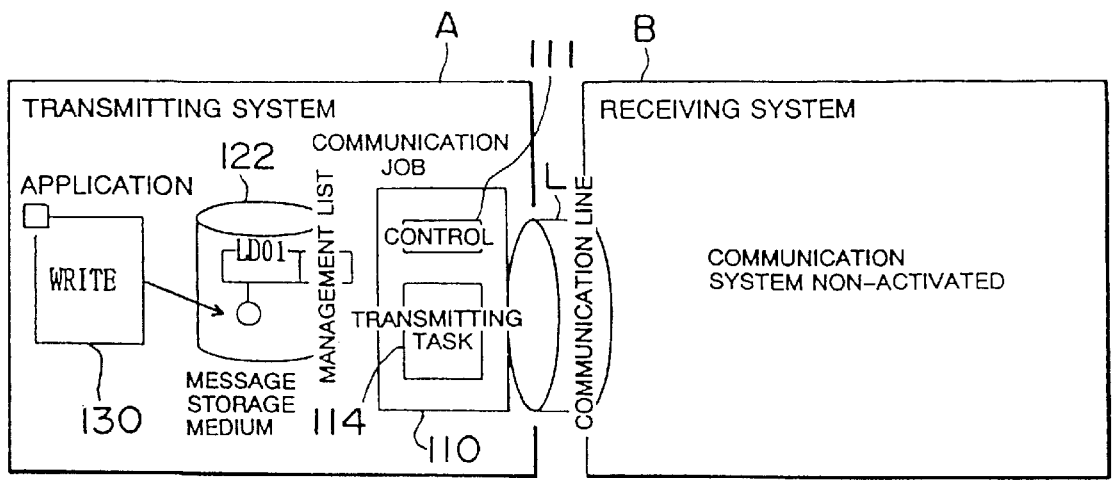
FIG. 16 is a diagram of assistance in explaining an operation of the embodiment.

FIG. 16 shows a status in which any processes in FIGS. 6 to 9 are not executed, because power is not supplied to the receiving-side system (system B) at all. In this status, it is assumed that the respective modules of the transmitting-side system (system A) are activated, and the transmitting task 114 of the transmitting-side communication job 110 transmits the communication path establishment request message (S102). In this case, no response is given from the receiving-side system (system B). Accordingly, the receiving task 114 does not execute any process.

Figure 17:
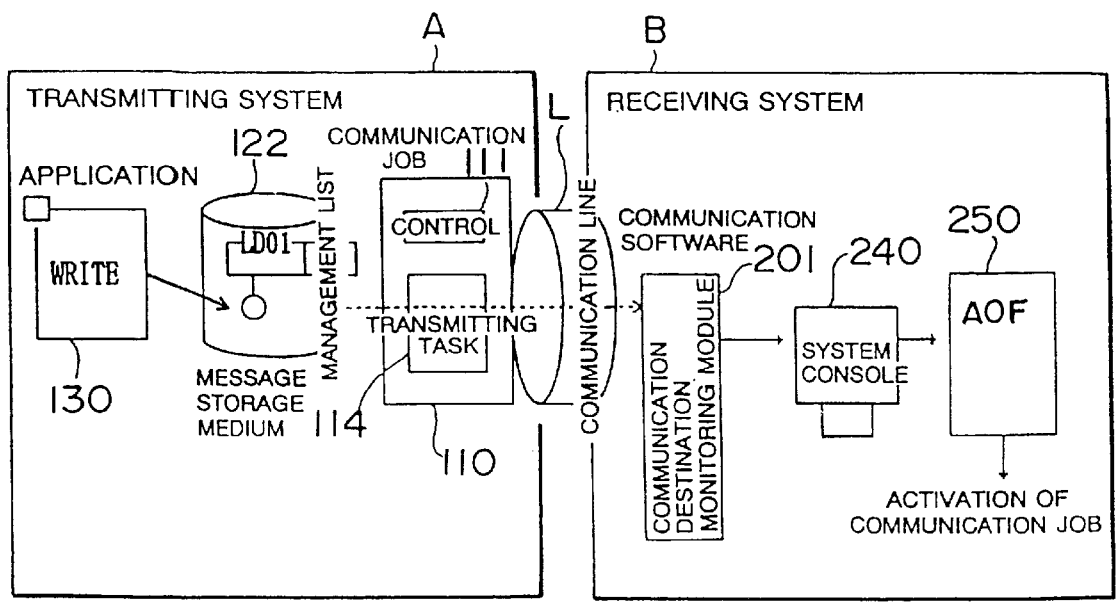
FIG. 17 is a diagram of assistance in explaining the operation of the embodiment.
Figure 18:
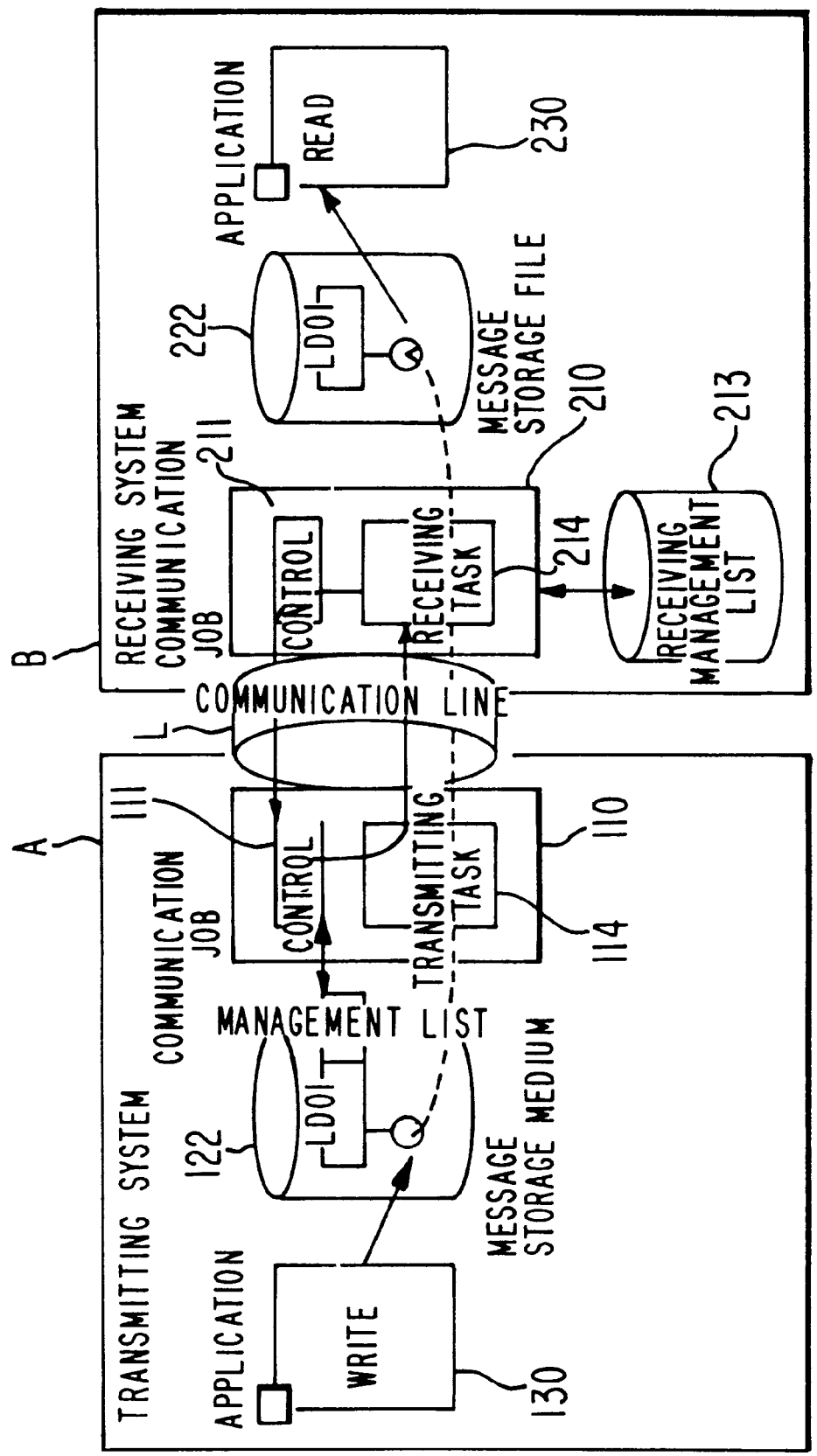
FIG. 18 is a diagram of assistance in explaining the operation of the embodiment.

Next, FIG. 17 shows a status in which the power is supplied to the receiving-side system (system B) ON, and the communication program 200 (the communication destination monitoring module 201) and the auto program activation module (AOF) 250 in FIG. 7 are activated. In this status, it is assumed that the respective modules of the transmitting-side system (system A) are activated, and the transmitting task 114 of the transmitting-side communication job 110 transmits the communication path establishment request message (S102). In this case, the communication destination monitoring module 201 of the communication program 200 determines that the receiving task as a destination of the communication path establishment request message is not yet activated (S202). As a result, the communication destination monitoring module 201 notifies the communication program 100 of the transmitting-side system (system A) of a failure of the establishment and outputs the destination information of the receiving task which is not yet activated to the system console 240.

The transmitting task 114, upon receiving a response of this establishment failure, registers the name of the receiving task as destination of data transmitting in the wait-for-activation list 113 of the transmitting-side control task 111 (S104) and thereafter continues to await the activation notification from the transmitting-side control task 111 (S111). Accordingly, the transmitting task 114 makes no activation request to the receiving-side system (system B) till the activation notification is given.

On the other hand, the system console 240 displays the destination information of the non-activated receiving task from the communication destination monitoring module 201. The auto program activation module (AOF) 250 detects the destination information of the non-activated receiving task displayed on the system console 240, thereby executing the activation process of the receiving-side control task 211 (S303). Upon executing this activation process, the receiving-side control task 211 is activated, and the receiving task 214 is also activated (S401). The receiving-side control task 211 and the receiving task 214 are prepared, whereby the receiving-side communication job 210 is generated. FIG. 18 shows this status.

Then, the receiving task 214 notifies the receiving-side control task 211 of the activation of itself (S503). The receiving-side control task 211 receiving this activation notification creates the activation notification message with reference to the receiving management list 213 (S403) and transmits this activation notification message to the transmitting-side communication job 110 of the transmitting-side system (system A) (S404).

The transmitting-side control task 111 of the communication job 110 receiving this activation notification message refers to the waiting-for-activation list 113 (S006) and notifies the transmitting task 114 of the activation of the receiving task (S007). The transmitting task 114 receiving this activation notification retransmits the activation request message to the receiving task 214 of the receiving-side system (system B) (S111, S102). In this case, the communication program 200 of the receiving-side system (system B) notifies the transmitting task 114 of the establishment (S203).

When the transmitting task 114 receives the establishment notification in the manner described above, the transmitting task 114 fetches the data (message) stored on the message storage medium 122 by the application 130 and transmits the data to the receiving task 214 of the receiving-side system (system B). This receiving task 214 stores a message storage file 222 with the thus received data (message). Thus, the data (message) stored in the message storage file 222 are read by the application 230.

In accordance with this embodiment, as discussed above, the respective receiving tasks 214, 217 are automatically activated, and the communication path is automatically established between the transmitting-system (system A) and the receiving-side system (system B), whereby the inter-computer communications can be performed.

According to this invention being thus described, it will be obvious that same may be varied in same way. Such variations are not regarded as a departure from the spirit and scope of the invention, and all such modifications as would be obvious to one skilled in the art intended to be included within the scope of the following claims.

We claim:

1. An inter-computer communication system transmitting data via a communication path established between a transmitting means of a first computer system for transmitting data and a receiving means of a second computer system for receiving the data, said first and second computer systems are communicable when the first and second computer systems are in activation synchronism, said first computer system comprising:
   requesting means for executing a request for establishing the communication path to said second computer system; and
   reexecuting means for making said requesting means reexecute the request for establishing the communication path in accordance with a notification, prior to establishing the communication path, from said second computer system, said second computer system comprising:
   activating means for activating said receiving means, if said receiving means is not activated when said requesting means requests the establishment of the communication path;
   notifying means for notifying said reexecuting means if said activating means activates said receiving means; and
   responding means for establishing the communication path to said first computer system if said receiving means has been activated when said requesting means executes the request for establishing the communication path.

2. An inter-computer communication system according to claim 1, wherein
   said second computer system includes a plurality of receiving means each having a unique identifier,
   said requesting means specifies the communication path connected to one of said plurality of receiving means having an identifier by designating said identifier,
   said activating means activates said one of said plurality of receiving means having the designated identifier,
   said notifying means notifies the identifier of said activated receiving means,
   said responding means establishes, when said receiving means having the designated identifier has already been activated, the communication path to said first computer system, and
   said activating means activates said receiving means having the identifier designated by said requesting means.

3. An inter-computer communication system according to claim 1, wherein
   each of said first and second computer systems has a unique system name, and
   said requesting means specifies one of said first and second computer systems as a target of said request for establishing the communication path by designating the corresponding system name.

4. An inter-computer communication system according to claim 2, wherein
   said reexecuting means makes said requesting means reexecute the request for establishing the communication path with respect to the communication path connected to said one of said plurality of receiving means having the identifier notified by said notifying means.

5. An inter-computer communication system according to claim 1,
   wherein said first computer system includes a plurality of requesting means each having a unique identifier.

6. An inter-computer communication system according to claim 5, further comprising:
   a table for registering the identifier of said plurality of requesting means which has executed the request for establishing the communication path, without response of the establishment of the communication path,
   wherein said reexecuting means makes said one of said plurality of requesting means having the identifier registered in said table reexecute the request for establishing the communication path.

7. A first computer system for receiving data transmitted from a second computer system via a communication path established between said first and second computer systems, the first and second computer systems are communicable when the first and second computer systems are in activation synchronism, comprising:
   receiving means for receiving the data when said receiving means is activated;
   activating means for activating said receiving means, if said receiving means is not yet activated when an initial request for establishment of the communication path is executed by said second computer system;
   notifying means for notifying said second computer system to reexecute the initial request, prior to establishment of the communication path, when said activating means activates said receiving means; and
   responding means for establishing the communication path to said second computer system if said receiving means has been activated when the establishment of the communication path is requested by said second computer system.

* * * * *